United States Patent Office 3,408,101
Patented Oct. 29, 1968

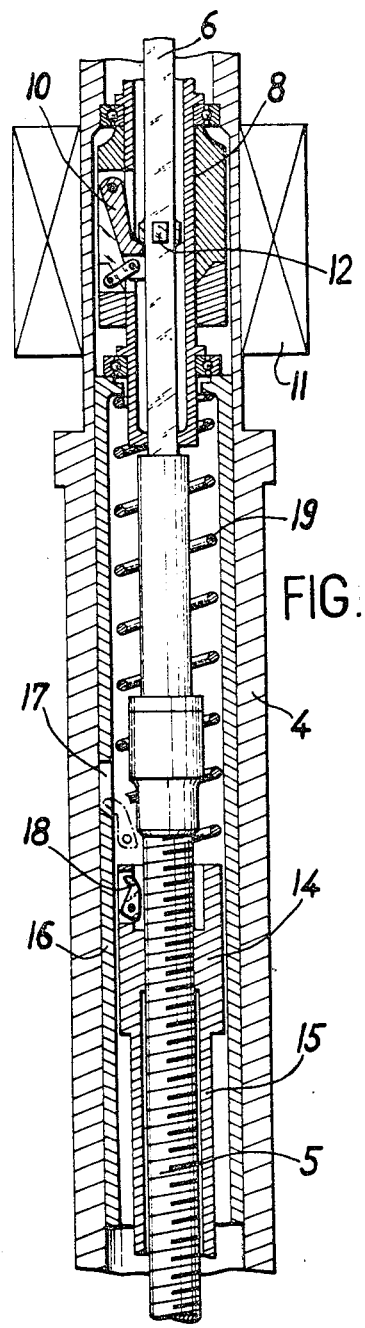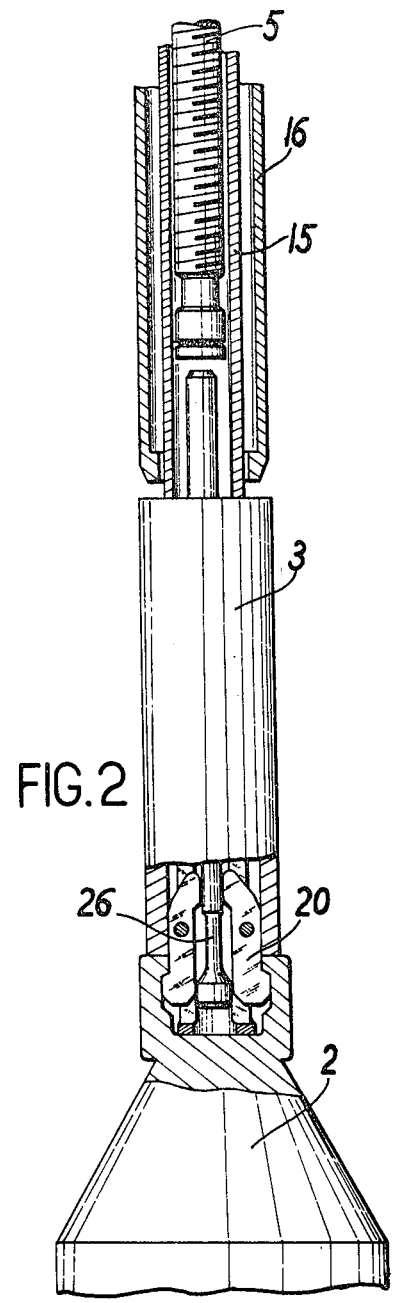

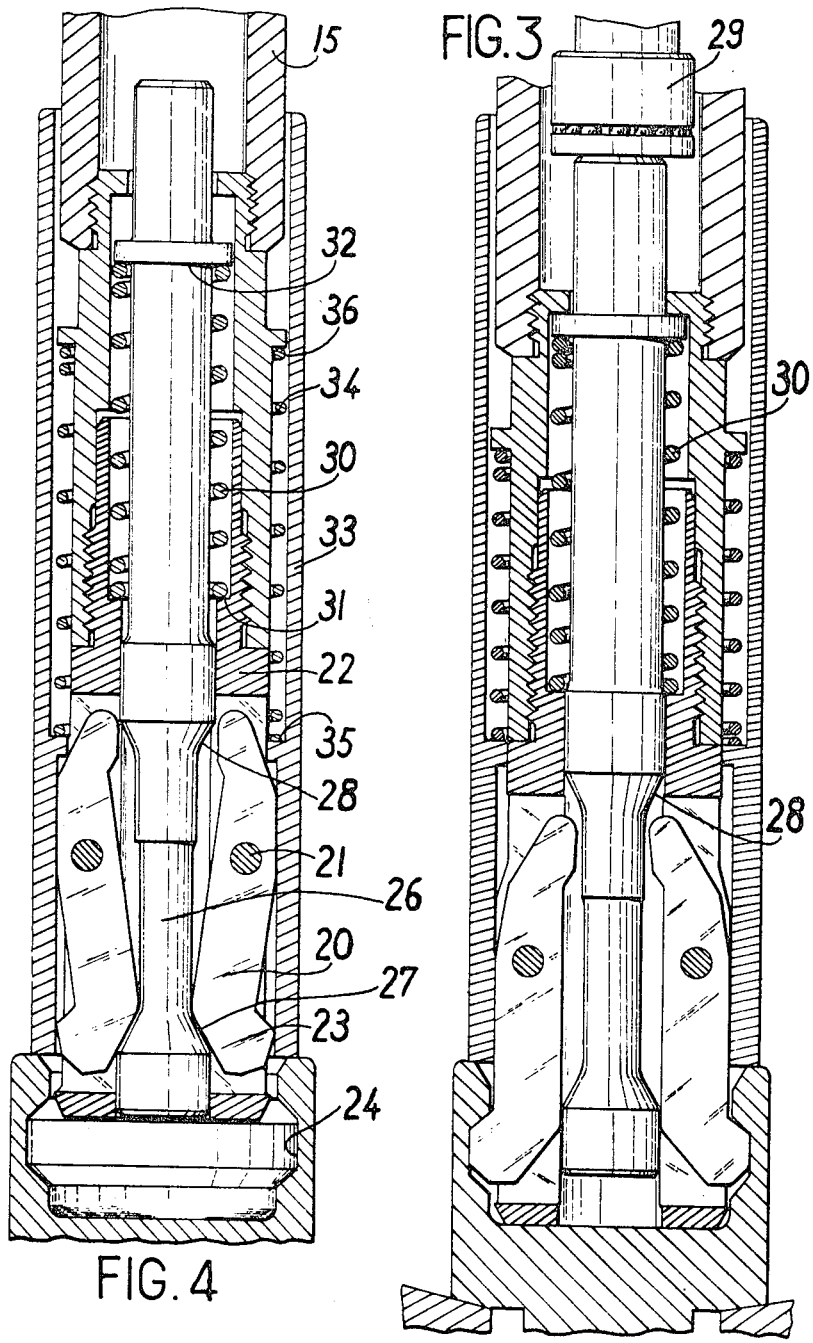

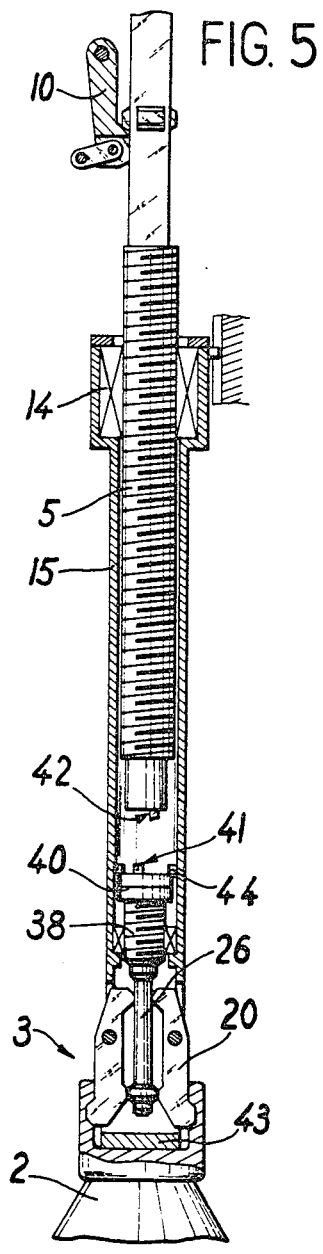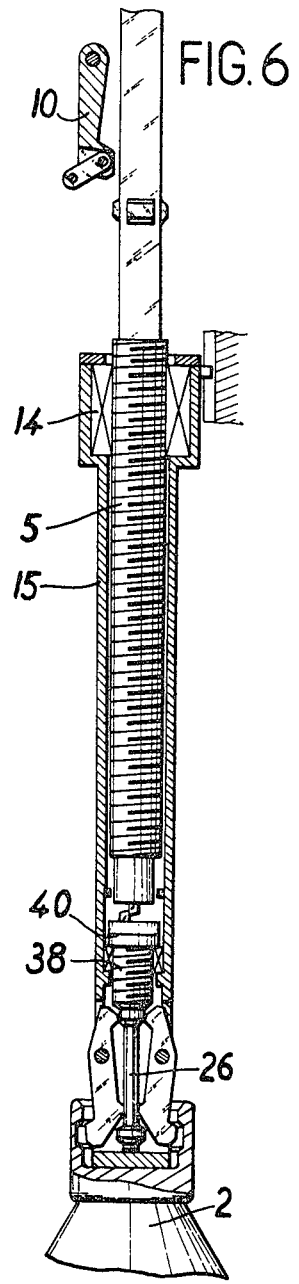

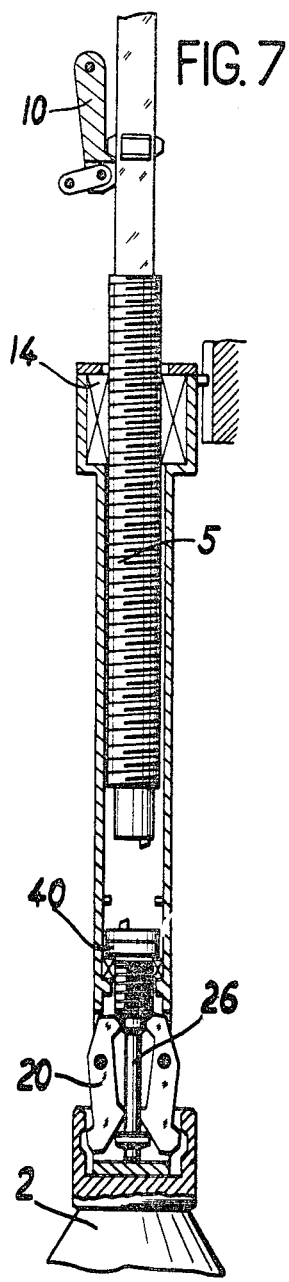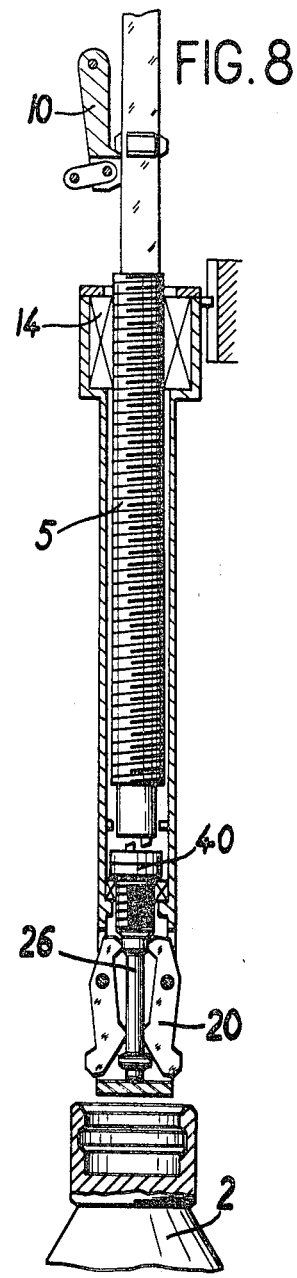

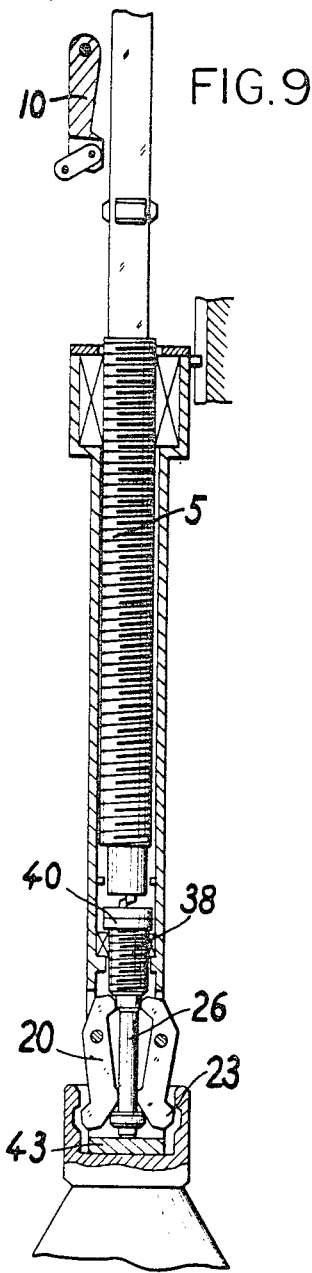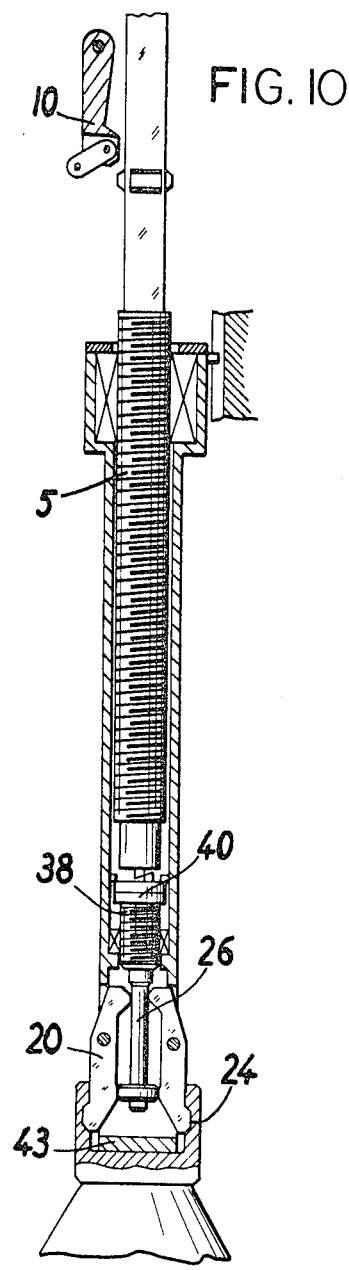

3,408,101
CONTROL ROD DRIVE MECHANISM
Fernand Jules Etienne Savary, St. Leu-la-Foret, France, assignor to Societe des Forges et Ateliers du Creusot (S.F.A.C.), Paris, France
Filed July 5, 1966, Ser. No. 562,746
Claims priority, application France, July 12, 1965, 24,401
8 Claims. (Cl. 294—86.25)

ABSTRACT OF THE DISCLOSURE

Drive mechanism for a control rod of a nuclear reactor has a threaded rotary driven rod with a follower thereon coupled to a sleeve which sleeve is splined in an outer sleeve. A grab is mounted at the end of the sleeve and is actuated by an operating pin engaged by the threaded rod. Latches hold the threaded rod in upper position for movement of the control rod which when released drop the threaded rod and associated structure for engagement for the rotary rod with the operating pin.

---

The present invention relates to a nuclear reactor control rod drive mechanism of the type comprising a grab for engaging the control rod and a screw and nut drive system.

It is known to employ for the purpose of actuating control rods devices which comprise two interengaged elements having a helical screw-thread, means for driving a first element in rotation, at least one retractable latch for securing said element against translational motion, means for securing the second element against rotation while permitting of its axial translational motion and a grab for engaging the control rod which is fixed to said second element.

The devices of this type make it possible, starting from a movement of rotation which is effected from the exterior of the reactor, to ensure under normal operating conditions the longitudinal displacement of the control rod which thus penetrates to a greater or lesser extent into the reactor core, thereby permitting control of reactivity of the reactor. The retractable latch also makes it possible in the event of emergency to release both elements and the grab at the same time. Thus, the control rod is dropped into the reactor core at high speed and thus performs the function of a safety rod. Finally, the rod-holding grab makes it possible to disconnect the control rod at the moment, for example, of fuel element handling operations during reactor shut-down when the control rod is in the lowermost position within the reactor core.

The present invention makes it possible to utilize the two elements hereinabove defined both for effecting the longitudinal displacement of the control rod and also for the purpose of operating the grab. Among other advantages, the operations which make it possible to disengage the control rod from its drive mechanism are accordingly simplified to an appreciable extent inasmuch as there is no longer any need to break the seal in order to introduce into the reactor the special tooling which is required in order to operate the grab.

The aim of this invention is to meet practical requirements more effectively than has been the case in all designs of the prior art, especially insofar as it introduces simplifications both in mechanical design and in operating procedure. The invention proposes a mechanism which is characterized by high operational safety and the control of which may be entrusted to less experienced operators than was the case in comparable systems of the prior art.

The mechanism in accordance with the invention is characterized in that it comprises two interengaged elements with helical screw-threads, means for driving a first element in rotation, means for securing the second element against rotation while permitting of its axial translational motion, a grab for engaging the control rod and fixed to said second element, at least one latch for securing the first element against translational motion in a first position for driving the grab in translational motion, means for retracting said latch and bringing said first element into a second position for actuating the grab so as to release the control rod and means for locking the grab in the disengaged position at the time of withdrawal of the first element from the second to the first position.

In accordance with a secondary characteristic feature of the invention, the locking means are constituted by a sleeve which is coupled to the second element by elastic means for restoring the grab from a locked position to a disengaged position, and comprising abutment means which are capable of cooperating with the control rod for thrusting back said sleeve into a position in which the grab is disengaged. Preferably, said elastic means are such that they are capable of overcoming the resistance which results from the weight both of the two elements and of the grab when the control rod is released.

The invention applies especially to the mechanisms in which the grab comprises at least two latches pivotally attached to a body which is rigidly fixed to the second element and an operating pin fitted with abutment means which are capable, when the first element is in the second position thereof, of cooperating with corresponding means provided for this purpose on said second element so as to effect the displacement of the operating pin from an engaged position to a disengaged position of the control rod.

In accordance with an embodiment which is particularly well adapted to this case, the mechanism comprises a unit which provides a friction coupling between the first element in the second position thereof and the operating pin which is provided in the same manner as the second element with a helical connection having the same pitch as the connection between the two elements, said coupling unit comprising two discs which are capable of being driven in rotation one by the other when the driving torque exceeds a predetermined value, a first of said discs being integral with the operating pin and the second of said discs and the extremity of the first element being each provided with an eccentric lug which is parallel to the axis of translational motion, both lugs being capable of coming into contact with each other so as to make it possible to drive the second disc by means of the first element and to slide against each other in the axial direction over a predetermined distance.

In order that the advantages and essential features of the invention may be more readily understood, two particular embodiments thereof which are chosen by way of indication without any limitation being implied are described hereinafter. Reference is made in the description to FIGS. 1 to 10 of the accompanying drawings, in which:

FIG. 1 is a part-sectional view of the upper portion of the mechanism herein described;

FIG. 2 shows the lower portion of the mechanism of FIG. 1 in a first embodiment thereof;

FIG. 3 is a more detailed view of the grab which engages the control rod;

FIG. 4 shows the same grab in another position;

FIGS. 5 to 10 show the various positions of the different elements of the mechanism in another embodiment.

The mechanism herein described is employed for the purpose of driving a control rod 2 in vertical translational motion within the core of a reactor which is not illustrated in the drawings, and is essentially constituted by a grab 3 for engagement with the control rod 2 and by a screw and nut drive system which passes within a seal tube 4 through the top seal plug of the reactor tank. Said tank is filled with a liquid such as water which constitutes the coolant and/or the moderator of the reactor. The positions of the different elements in FIGS. 1 and 2 correspond to the case in which the control rod 2 is engaged by the grab 3 and located in the uppermost position thereof.

The lead screw 5 of the drive system has a top extension in the form of a square rod or stem 6 which can be driven in rotation by means of any suitable mechanism of known type which makes use, for example, of a magnetic coupling. This mechanism is not illustrated in the figures.

The stem 6 is made fast for rotation with a bushing 8 which is disposed within the seal tube 4. There is mounted in the thickness of said bushing a latch 10 which is actuated by means of an electromagnet 11. A plurality of similar latches can be provided. When the lead screw 5 is located in the uppermost position thereof as shown in FIG. 1, keys 12 which are provided on the four faces of the stem 6 come into abutment with the latch 10 which accordingly maintains the lead screw in this position. On the other hand, when the latch 10 is withdrawn by de-energizing the electromagnet 11, the lead screw and stem are free to move in vertical translation within the bushing 8.

The lead screw 5 is engaged with the nut 14 and this latter is provided with an extension in the form of a connecting tube 15 which is adapted to slide freely over the lead screw 5 and carries at its extremity the grab 3. The nut 14 is adapted to slide vertically within a splined tube 16 which prevents the rotation of said nut. The splined tube 16 has a recess 17 into which is pivotally retractable a pawl 18 which is carried by the nut 14 and thrust back by an annular enlargement or shoulder of the lead screw 5 when the nut is located in its uppermost position. The function of said pawl is to maintain the nut in that case in the uppermost position when the control rod is disengaged, even if the latch 10 is withdrawn by cutting off the supply to the electromagnet 11.

The lower end of the splined tube 16 is provided with an annular shoulder which leaves only a small clearance between said tube and the connecting tube 15. The space which is formed between the two tubes thus constitutes a hydraulic damping chamber for the nut 14 when this latter is inserted in the core at high velocity with the lead screw 5 which is released by withdrawal of the latch 10.

A helical spring 19 is disposed around the lead screw 5 and is applied against an annular shoulder of the splined tube 16 and against the top face of the nut 14. Said spring is compressed when the nut (and therefore the grab 3) is located in the uppermost position. The function of the spring is consequently to accelerate the falling motion of the assembly consisting of lead screw, nut, grab and control rod when the safety drive mechanisms initiate the withdrawal of the retaining latch 10.

As appears from FIGS. 3 and 4, the grab 3 for holding the control rod is constituted by three latches 20 which are pivoted about pins 21 carried by the grab body 22 which is coupled to the connecting tube 15. The control rod 2 is held by engagement of the lower heels 23 of the latches 20 within a circular groove 24 which is formed in the head of the control rod.

An operating pin 26 is disposed lengthwise in the center-line of the grab between the latches 20. Provision is made at the level of said latches for two conical bearing surfaces 27 and 28 which bring the grab progressively at the time of vertical displacements of the pin 26 into the control rod engagement or release position by exerting a radial thrust on one of the ends of the latches 20.

The different elements hereinabove defined are common to the two embodiments of the invention under consideration, the distinctive features of which will now be described below at the same time as the mode of operation thereof.

*First embodiment (FIGS. 1 to 4)*

A helical spring 30 is compressed between an internal annular shoulder 31 of the grab body 22 and an outer annular shoulder 32 of the operating pin 26. Said spring tends to return the operating pin to its uppermost position, namely the position which corresponds to the disengaged position of the grab.

A locking sleeve 33 is placed around the latches 20. Said locking sleeve is adapted to slide around the grab body 22 and is coupled axially with this latter by means of a helical spring 34, one end of which is applied against an inner annular shoulder 35 of the locking sleeve and the other end of which is applied against an outer annular shoulder 36 of the grab body. Said spring 34 tends to thrust the locking sleeve 33 in a downward direction into a position in which said sleeve surrounds the latches 20 and prevents the outward displacement of these latter. The grab is thus locked in the disengaged position.

*Normal operation*

The control rod 2 is engaged by the grab 3 (as shown in FIG. 2), the latches 20 being held in the outwardly displaced position by the pin 26 which is acted upon by the spring 30. The lead screw 5 is maintained in the top position by the retaining latch 10. The lower end of the locking sleeve 33 is applied against the head of the control rod 2 and the spring 34 is compressed.

By means of the drive mechanism which has not been illustrated in the drawings, the lead screw 5 is caused to rotate either in one direction or in the other for the purpose of controlling the reactivity of the reactor: the nut 14 moves either up or down correlatively and draws with it the grab 3 and the control rod 2. The travel of the nut 14 is limited by two positions corresponding to a maximum absorption (control rod located at the bottom of the reactor) and to a minimum absorption (control rod in the top position, locking sleeve 33 in position of abutment with the splined tube 16).

*Safety*

In the case of abnormal increase in reactivity of the reactor, the latch 10 is withdrawn and the spring 19 thrusts back the complete mechanism together with the control rod 2, which thus drops to the bottom of the reactor.

*Control rod release*

In order to release the control rod 2, the initial step consists in moving the control rod into its lowermost position at the bottom of the reactor by rotating the lead screw 5. The withdrawal of the latch 10 is then carried out by de-energizing the electromagnet 11.

By then rotating the lead screw 5 in the opposite direction, said lead screw is caused to move downwards whilst the nut 14 remains motionless by virtue of its own weight. The ball thrust bearing 29 which is provided on the lower end of the lead screw 5 is applied against the operating pin 26 and thrusts this latter downwards in opposition to the spring 30 (as shown in FIG. 3). The conical bearing surface 28 thrusts back the heads of the latches 20.

As soon as the bottom heels 23 are released from the groove 24, the spring 34 comes into action (as shown in FIG. 4) and bears on the head of the control rod 2, thereby thrusting upwards the grab, the connecting tube 15 and the nut 14 at the same time as the lead screw 5. The latches 20 are then enclosed within the locking sleeve 33 which maintains said latches in the disengaged position.

The operator can then raise the lead screw 5 to the top position thereof whilst the nut remains applied by means of the locking sleeve 33 against the head of the control rod. The electromagnet 11 is then re-energized so as to maintain the lead screw in the uppermost position and thus to permit the upward motion of the nut 14 and the grab 3 by rotating the lead screw in the opposite direction.

As is brought out by the foregoing description, the grab disengagement operation is particularly simple and is within the capacity even of operators who have had little practical experience. In fact, it is merely necessary, after releasing the lead screw for translational motion to lower said screw as far as possible. When it becomes impossible to continue the movement of rotation of the lead screw, it is then certain that the latches 20 have moved up and that they have been locked in position by the locking sleeve 33.

*Engagement of the control rod*

Inasmuch as the control rod 2 has remained at the bottom of the reactor, the movement of rotation of the lead screw 5 which is retained by the latch 10 is initiated in order to lower the nut 14 as far as possible. At a given moment, the locking sleeve 33 is brought to bear on the head of the control rod, the spring 34 is compressed and the heels of the latches 20 penetrate into the groove 24 as soon as they reach the level of this latter. The spring 30 then expands and displaces the operating pin 26 in an upward direction.

It is observed that the engagement operation is as simple as the disengagement operation.

*Second embodiment (FIGS. 5 to 10)*

There are again shown in FIGS. 5 to 10 the control rod 2, the lead screw 5 and its retaining latch 10, the nut 14 and the grab 3 together with its latches 20 and the operating pin 26.

The top portion 38 of the operating pin 26 is provided with a screw-thread which has the same pitch as that of the lead screw 5 and cooperates with a corresponding screw-thread of the connecting tube 15 between the nut 14 and the grab 3.

The operating pin 26 comprises in addition a friction clutch unit 40 which provides a coupling between said pin and the lower portion of the lead screw 5 when this latter is in the bottom position. The clutch unit 40 is provided with an eccentric vertical lug 41 which is adapted to cooperate for this purpose with a lug 42 of the lead screw 5.

The clutch unit 40 can be of any known type; it can be constituted, for example, by two horizontal discs, one of which is integral with the operating pin 26 whilst the other disc carries the lug 41, said two discs being applied against each other by means of springs.

The travel of the operating pin 26 is limited at one end by abutting contact with the bottom 43 of the grab body and at the other end by stops 44 which are integral with the connecting tube 15.

*Normal operation and safety operation*

The upward motion and downward motion of the control rod 2 take place in accordance with FIG. 5 in precisely the same manner as hereinabove described in connection with the first embodiment considered.

*Control rod release*

Inasmuch as the control rod 2 is in the bottom position, the retaining latch 10 is withdrawn and the lead screw 5 is lowered by rotation within the nut 14.

As soon as the two lugs 41 and 42 come into contact with each other, the operating pin 26 is also driven in rotation by means of the friction clutch unit 40. In fact, the only resistance to be overcome is that of the latches 20. Said latches open (as shown in FIG. 6) and the movement of rotation of the lead screw 5 is stopped as soon as the operating pin 26 comes into abutment with the bottom 43 of the grab body; an end-of-travel contact is provided for this purpose.

If the lead screw 5 is rotated in the opposite direction, the lugs 41 and 42 are no longer in contact with each other and the lead screw can be raised to its uppermost position without being accompanied by the pin 26 (as shown in FIG. 7). The grab remains in the disengaged position.

After the lead screw 5 is secured against translational motion by the latch 10, the movement of rotation of said screw in the opposite direction makes it possible to move the nut 14 and the grab upwards while leaving the control rod 2 in its lowermost position (as shown in FIG. 8).

*Engagement of the control rod*

Inasmuch as the different elements are initially in the position of FIG. 8, the nut 14 is lowered by rotating the lead screw 5. The latch 10 is then released and the lead screw 5 is then moved downwards in its turn by producing a movement of rotation in the opposite direction. By virtue of the presence of the friction clutch unit 40, the movement of rotation can be continued after the lugs 41 and 42 have come into contact with each other. The upper disc of the clutch unit 40 is driven without thereby actuating the operating pin 26 which is in abutting contact with the bottom 43 of the grab body. The lead screw 5 moves down over a short distance and the lugs 41 and 42 slide vertically over each other (as shown in FIG. 9).

When movement of rotation in this direction is no longer possible, the lead screw 5 is caused to rotate in the opposite direction. The said lead screw accordingly moves upwards whereas the lugs 41 and 42 remain in contact with each other for a predetermined number of revolutions and the torque exerted is sufficient to drive the operating pin 26 upwards. Said pin thrusts back the latches 20, the heels of which engage in the groove 24 of the control rod (as shown in FIG. 10). The movement of rotation of the lead screw is then continued so as to move said lead screw upwards to its top position.

What I claim is:

1. A nuclear reactor control rod drive mechanism comprising two interengaged elements with helical screw-threads, means for driving a first element in rotation, means for securing the second element against rotation while permitting of its axial translational motion, a grab for engaging the control rod and fixed to said second element, at least one latch for securing the first element against translational motion in a first position for driving the grab in translational motion, means for retracting said latch and bringing said first element into a second position for actuating the grab so as to release the control rod and means for locking the grab in the disengaged position at the time of withdrawal of the first element from the second to the first position.

2. A control rod drive mechanism as defined in claim 1, wherein the grab comprises at least two latches pivotally attached to a body which is rigidly fixed to the second element and an operating pin fitted with abutment means which are capable, when the first element is in the second position thereof, of cooperating with corresponding means provided for this purpose on said first element so as to effect the displacement of the operating pin from an engaged position to a disengaged position of the control rod.

3. A mechanism as defined in claim 1, wherein said locking means are constituted by a sleeve which is coupled to the second element by elastic means for restoring the grab from a locked position to a disengaged position, and comprising abutment means which are capable of cooperating with the head of the control rod for thrusting back said sleeve into a position in which the grab is disengaged.

4. A mechanism as defined in claim 3, wherein said elastic means are capable of overcoming the resistance which results from the weight both of the two elements and of the grab when the control rod is released.

5. A mechanism as defined in claim 2, wherein the grab comprises elastic means for returning the operating pin to the engaged position.

6. A mechanism as defined in claim 2, wherein the operating pin is provided in the same manner as the second element with a helical connection having the same pitch as the connection between the two elements.

7. A mechanism as defined in claim 2, comprising a unit which provides a friction coupling between the first element in the second position thereof and the operating pin, said friction coupling unit being intended to permit by rotating the first element in one direction from its second position to effect the displacement of the operating pin from the engaged position thereof to a disengaged position, to continue the rotation of the first element over a predetermined distance without modifying the position of the operating pin, then by rotating the first element in the opposite direction to return the operating pin from the disengaged position to the engaged position.

8. A mechanism as defined in claim 7, wherein said coupling unit comprises two discs which are capable of being driven in rotation one by the other when the driving torque exceeds a predetermined value, a first of said discs being integral with the operating pin and the second of said discs and the extremity of the first element being each provided with an eccentric lug which is parallel to the axis of translational motion, both lugs being capable of coming into contact with each other so as to make it possible to drive the second disc by means of the first element and to slide against each other in the axial direction over a predetermined distance.

References Cited

UNITED STATES PATENTS

| | | | |
|---|---|---|---|
| 2,026,778 | 1/1936 | Dumble | 294—116 |
| 2,245,571 | 6/1941 | Chappell | 294—86.2 |
| 3,175,720 | 3/1965 | Millot et al. | 294—95 |

EVON C. BLUNK, *Primary Examiner.*

R. D. GUIOD, *Assistant Examiner.*